PICTURE SIGNAL RECEIVING SYSTEM

Filed March 21, 1963 3 Sheets-Sheet 1

Norikazu Sawazaki
INVENTOR.
BY George B. Oujevolk
Attorney

FIG. 5
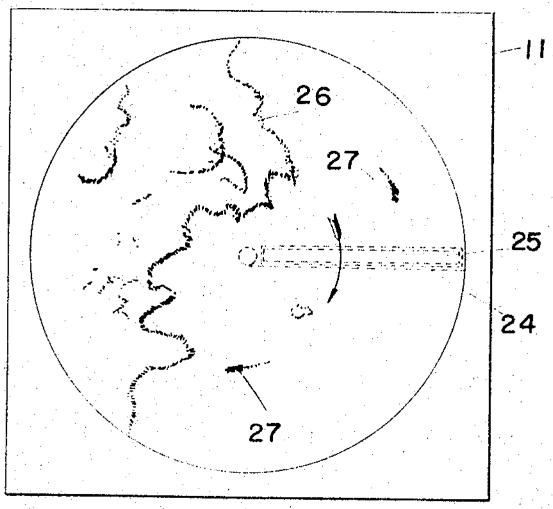
FIG. 6
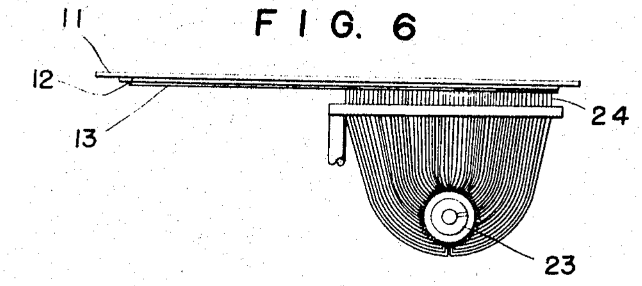
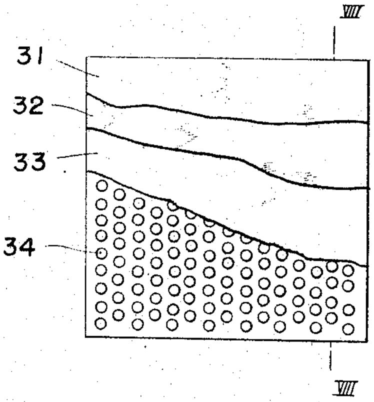
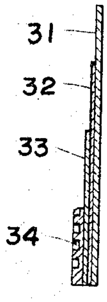
FIG. 7 FIG. 8
Norikazu Sawazaki
INVENTOR.
BY George B. Oujevolk
Attorney Norikazu Sawazaki
INVENTOR.
BY George B. Oujevolk
Attorney

United States Patent Office 3,308,473

Patented Mar. 7, 1967

3,308,473

PICTURE SIGNAL RECEIVING SYSTEM

Norikazu Sawazaki, Yokohama-shi, Japan, assignor to Tokyo Shibaura Electric Co., Ltd., Kawasaki-shi, Japan, a corporation of Japan Filed Mar. 21, 1963, Ser. No. 266,861
2 Claims. (Cl. 346—74)

This invention relates to picture signal receiving systems and more particularly to a picture signal receiving system capable of producing large and clear picture images by an electrostatic or magnetic recording device.

Heretofore kinescopes have been usually utilized as the image reproducing device for television receiving and to indicate patterns of radars, but in such cases it has been very difficult to provide pictures or images of very large size owing to the construction of the kinescope. Moreover, production of bright pictures was inherently limited. In addition, it was generally required to use broad bank transmission paths for transmitting picture signals.

Therefore it is the principal object of this invention to eliminate above mentioned disadvantages and to provide a novel picture receiving system which is not limited in the size of the picture reproduced and yet can produce very bright pictures.

Further object of this invention is to provide a novel picture signal receiving system which is not limited in the size of the reproduced picture as in the prior kinescopes.

Still further object of this invention is to provide a picture signal receiving system which can provide pictures viewable in very light rooms.

Another object of this invention is to provide a novel picture signal receiving system which can effectively reproduce pictures even by utilizing a narrow band width transmission path.

Still another object of this invention is to provide an advertising or indicating device which can be controlled from remote positions.

Briefly stated the above and other objects are achieved in accordance with this invention by providing a picture signal receiving system comprising a picture receiving surface, an electrostatic or magnetic recording device capable of moving relative to said picture receiving surface to scan it, means to apply a picture signal voltage to said recording device to electrically charge or magnetize said picture receiving surface to form thereon a charged or magnetized latent image, means to form a powder image on said picture receiving surface by attracting minute powders by the electrostatic attractive or magnetic attractive force of said latent image whereby to form a powder image thereon and means to continuously erase said powder image. When the picture receiving surface is made of a light transparent material and illuminated from its back side, a clear image of the received picture can be provided in much larger size than any previous devices, and when the powders to be attracted by the latent image are suitably colored, the image produced can be made clearer.

While the invention concludes with claims particularly pointing out and distinctly claiming the subject matter which is regarded as this invention, it will be understood that the invention will be better understood from the following description taken in connection with the accompanying drawings, in which FIG. 1 shows a plan view of one embodiment of this invention to explain the principle of the picture signal receiving system embodying this invention;

FIG. 5 shows a plan view of another embodiment of this invention as applied to the reproduction of radar signals;

FIG. 6 is a front elevation of FIG. 5;

FIG. 7 shows a plan view of a mosaic type picture receiving screen suitable for use in this invention;

FIG. 8 is a side elevation of the picture receiving screen shown in FIG. 7 taken along the line VIII—VIII thereof;

Figures 1, 2:
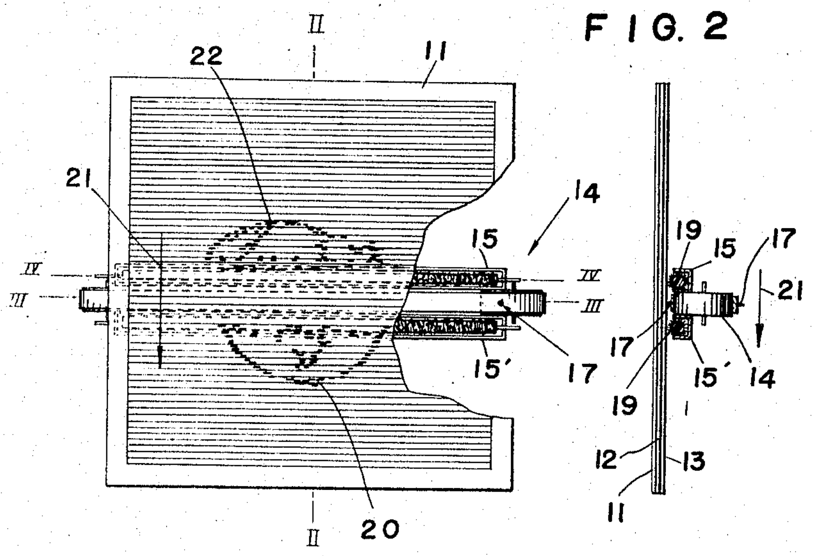
FIG. 2 is a side view of the devices shown in FIG. 1 taken along the line II—II thereof.

Referring now to the accompanying drawings, as shown in FIGS. 1 to 4, the picture receiving screen 11 or plate comprises a colorless transparent base plate such as glass or metacrylic resin, for example, a transparent electric conductive layer 12 such as NESA coating and the like deposited on one surface thereof and a high insulating electric charge memory layer 13 coated upon the layer 12.

A picture recording device is arranged beneath said picture receiving plate in contact with or in close proximity to the memory layer 13. The picture recording device comprises a charger 14 to electrically charge the picture receiving plate 11 and a pair of developing devices 15 and 15' mounted on the opposite sides of the charger 14.

Figure 3:
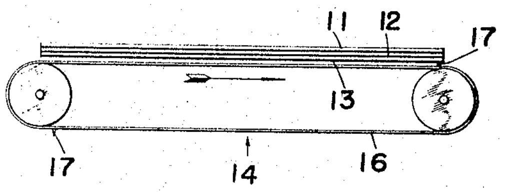
FIG. 3 shows a side elevation of the device shown in FIG. 1 taken along the line III—III thereof.

As shown in FIG. 3 the charger 14 comprises two or more recording needle electrodes 17 which are mounted at equal spacings on an endless belt 16 driven mechanically by an electric motor or any other suitable source of drive, not shown. The outer ends of the recording needle electrodes are arranged to make electric contact with the lower surface of the insulating film 13 of the picture receiving plate to scan it when they are moved in the direction indicated by an arrow across the picture receiving plate.

Figure 4:
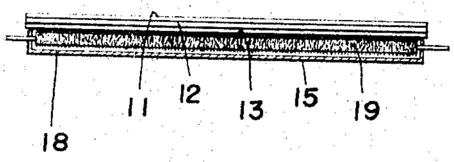
FIG. 4 is a sectional view taken along the line IV—IV of FIG. 1.

As best shown in FIG. 4 each of the developing devices 15 and 15' disposed on the opposite sides of said charger 14 includes a magnet brush 19 composed of a permanent magnet rod which is journaled to rotate in a container 18 which contains a powdered mixture of iron oxide and developer. As the brush rotates these powders attached to the periphery of the brush are brought to come into contact with the lower surface of the picture receiving plate 11.

The electrostatic recording device comprising said charger 14 and the developing devices 15, 15' and the picture receiving plate 11 is arranged to move relatively in a direction perpendicular to the direction of movement of the needle electrodes 11 of the charger indicated by the arrow. For large receiving plate it is usually advantageous to hold stationary the receiving plate 11 while at the same time to reciprocate the recording device so as to scan the picture receiving plate 11 substantially across its entire surface. This is also beneficial from the standpoint of producing clear views.

FIG. 1 shows a manner wherein the recording device is moved beneath the lower side of the picture receiving plate 11 having the conductive layer 12 and an insulating film 13 in the direction shown by an arrow 21 to erase the powder picture 20 formed previously while at the same time to form new powder picture 22. In this case the developing device 15' moving ahead of the charger 14 attracts by magnetic force powders which had been attracted on the insulating film 13 to form a powder picture to erase the picture. Following this, the recording needle 17 of the charger 14 which is moving in the direction indicated by the arrow will travel in the direction perpendicular to the arrow 21 to scan the lower surface of the picture receiving plate 11 from which the powder picture has been erased as mentioned above so as to impart an electric charge thereto in proportion to the picture signal voltage so that the picture is initially formed on the receiving plate in the form of an electric charge.

The developing device 15 adjacent said charger 14 will cause powders carried by the magnet brush 19 to contact with the lower surface of the picture receiving plate 11 so that the powder will be attracted by the electrostatic force proportional to the amount of electric charge imparted to the picture receiving plate 11 by the charger 14 whereby the image will be reproduced as a powder picture 22.

In the apparatus described above, since scanning is effected mechanically so that it is difficult to perform high speed scanning as in televisions, it is not only possible to produce pictures much larger than by a picture tube but also able to produce a brighter picture.

More particularly in radar and narrow band width facsimile and the like wherein high speed scanning is not necessary, images which are more easy to view can be reproduced according to this invention than by utilizing kinescopes.

Referring now to FIGS. 5 and 6 which show another embodiment of this invention especially suitable for use in receiving radar pictures, on the lower surface of the picture receiving plate 11 is disposed an electrostatic recording device embodying the principle described above along a radius of a circle having its center at the center of said picture receiving plate. The recording device is rotated around said center to erase, charge and develop pictures to produce circular images. In order to scan at a higher speed, it is advantageous to radially arrange chargers 24 in side by side relation to provide a group of recording needle electrodes as shown in the drawing and to connect them to a commutator switch 23 to sequentially apply the image signal voltage to these electrodes from one end to the opposite end whereby to scan in the radial direction in synchronism with the radar signal to charge the picture receiving plate 11. In the same way as has been described, the trailing developing device 25 supplies powders to be attracted by the picture receiving plate by the electrostatic force proportional to said charge. Thus a powder picture 26 is produced on the picture receiving plate 11.

Where more high speed scanning is desired, an electronic switching device may be substituted for said mechanical switching device utilizing said commutator switch, and the properties of the apparatus can be further increased when an integrating circuit is incorporated with the needle electrodes.

Like the apparatus shown in FIG. 1, developing devices 25 may be located on the opposite sides of the charger 24 so as to erase previously produced powder image by the leading developing device or by a specially designed eraser and to charge and develop a new powder picture by means of the trailing charger and developing device. However, in the case of radars it is advantageous not to completely erase the previously formed powder image so as to preserve some residual image and to superpose upon it a new powder image. Then, as shown in FIG. 5, a continuous trace of powder images of an aircraft is produced to represent the course and speed of the aircraft.

In carrying out into practice the picture receiving system of this invention, care should be taken to construct the apparatus to be moisture proof because the charge tends to leak under the influence of the moisture thus causing inaccurate memory.

For obviating such an undesirable effect the developing chamber should be hermetically sealed to contain a moisture absorbing agent so as to decrease leakage of the charge and to improve memory and developing functions. In addition, as shown in FIGS. 7 and 8, it is advantageous to construct the memory plate by depositing superposed layers of a transparent conductive film 32 and an insulating film 33 on one side surface of a transparent substrate 31 of glass, for instance, and conductive metal pieces 34 arranged in mosaic fashion and cemented onto the film 33 by using an insulating binder to increase electrostatic capacity. With such a memory plate troubles caused by leakage of the electric charge owing to moisture and the like can be minimized to improve the accuracy of the memory action.

Figures 9, 10, 11, 12:
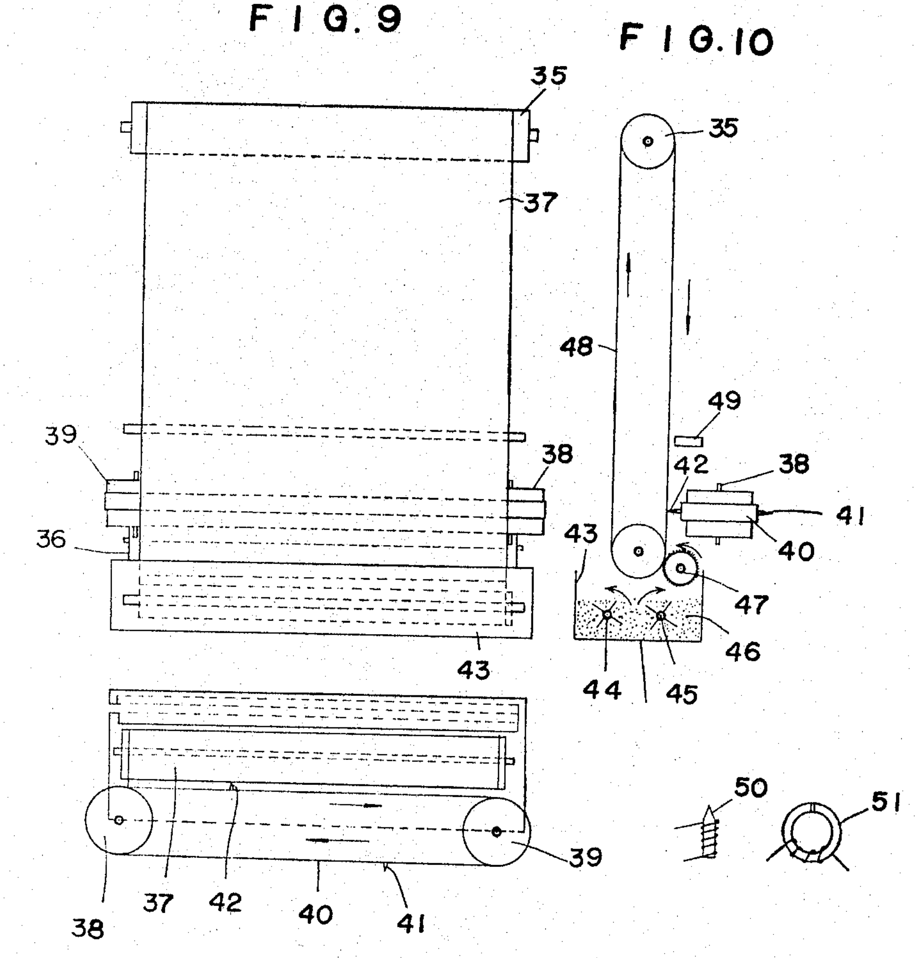
FIG. 9 is a plan view of still another embodiment of this invention.
FIG. 10 is a side elevation of the embodiment shown in FIG. 9.
FIG. 11 shows a side view of a magnetic driving mechanism of the embodiment shown in FIG. 9.
FIG. 12 shows two types of magnetic heads suitable for use in the embodiment shown in FIG. 9.

While in the foregoing embodiment of this invention as applied to electrostatic recording devices have been shown and described it should be understood that this invention can be used in magnetic recording devices. Thus, as shown in FIGS. 9 and 10, an endless magnetic tape or belt 37 of large width and passed around a pair of substantially parallel driving rollers 35 and 36 is painted white to constitute a picture receiving plate. This magnetic tape is driven by said rollers at low speed in the direction indicated by arrows. Across a portion of the magnetic tape 37 is disposed a scanning belt 40 passing around a pair of driving pulleys 38 and 39 to cause a plurality of magnetic heads 41 and 42 mounted on said scanning belt 40 to scan transversely across the surface of said magnetic tape while moving in contact therewith to produce magnetic latent images on the surface of said magnetic tape by the picture signals supplied to the magnetic heads 41 and 42. The lower side of the driving pulley 36 is disposed in a box 43 for the developing powder which is sufficiently large enough to accommodate said pulley. Disposed in the box 43 is an agitator 44 having a plurality of agitating vanes to continuously agitate and blow upwardly the magnetic developing powders 46 contained in the box 43 so that the powder might be attracted by the magnetic latent image recorded on the magnetic tape thereby reproducing picture images on the magnetic tape corresponding to the image signals. In order to prevent developing powders in the box blown up by the agitator from escaping out of the box, a rotary rod 47 covered by a flexible material such as felt is disposed to close the gap between the magnetic tape 37 and the upper edge of the box 43. Thus the pictures recorded by the scanning operation are continuously reproduced as powder pictures on the surface 48 of the magnetic tape 37 and transferred to the rear surface by the rotation of the pulleys 35 and 36 and thereafter the magnetic powders are removed by being attracted by an eraser 49 comprising a parmanent magnet arranged in contact with the back side of the magnetic tape. Thus the residual magnetism is eliminated to prepare for the new picture signals to be recorded on the magnetic tape.

FIG. 11 shows a schematic side elevation of a magnetic driving mechanism for rotating the magnetic heads. A plurality of magnetic heads 41 and 42 are secured to a scanning belt 40 passing around a pair of spaced driving pulleys 38 and 39 and function to scan at high speed while running in light contact with the magnetic tape. The magnetic head may take the form of either 50 or 51 shown in FIG. 12, but it is advantageous to construct the head so that the magnetic gap is concentrated at the tip as far as possible.

As will be clear from the above description this invention can provide very large picture images since the picture receiving area can be made extremely larger without any limitation when compared with prior kinescopes and the like. In addition since the picture receiving plate in the case of the electrostatic type or the magnetic tape in the case of the magnetic type can be made of a transparent material illuminated from its back side this invention is very suitable to use as the indicating boads in radar apparatus, picture indicating plate in narrow band width television telephones, remotely controlled advertising boards and the like.

While certain particular embodiments of this invention have been disclosed for purpose of illustration and description, it is to be understood that various changes can be made therein without departing from the true spirit and scope of the invention as defined in the appended claims.

What is claimed is:

1. A picture signal receiving device comprising
(a) a transparent picture receiving plate including
a transparent base plate,
and an insulating layer attached thereto,
(b) a charger mounted for relative movement in a plane parallel to said transparent picture receiving plate including
an endless belt mounted in a plane of rotation perpendicular to said base plate,
at least two recording needle electrodes mounted on said endless belt and positioned so as to make electrical contact with the surface of said receiving plate,
means to apply picture signal voltages to said needle electrodes for producing an electrostatic latent image on said receiving plate in accordance with said picture signal voltages,
a pair of magnetic brushes disposed on opposite sides of said charger and rotatively journalled in a box,
one of said pair of magnetic brushes positioned to erase prior existing developed powder,
and developing powder positioned for pickup by the other of said pair of magnetic brushes whereby said latent electrostatic image is developed.

2. The picture signal receiving device of claim 1 further including
a transparent conductive layer located between said transparent base plate and said insulating layer.

References Cited by the Examiner

UNITED STATES PATENTS

| | | | |
|---|---|---|---|
| 2,473,729 | 6/1949 | Salz | 346—74 |
| 2,943,908 | 7/1960 | Hanna | 346—74 |
| 3,069,681 | 12/1962 | Sloan | 346—74 |

BERNARD KONICK, *Primary Examiner.*

J. BREIMAYER, *Assistant Examiner.*